(12) United States Patent
Couturier

(10) Patent No.: US 6,600,751 B1
(45) Date of Patent: Jul. 29, 2003

(54) GATEWAY BETWEEN A DATA NETWORK AND A SERVICE NETWORK

(75) Inventor: Alban Couturier, Chatillon (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/422,346

(22) Filed: Oct. 21, 1999

(30) Foreign Application Priority Data

Oct. 22, 1998 (FR) ............................................. 98 13247

(51) Int. Cl.⁷ ............................................... H04L 12/28
(52) U.S. Cl. ........................ 370/401; 370/466; 709/311
(58) Field of Search ................................ 370/401, 410, 370/466, 352, 353, 354, 355, 356, 357, 373, 384, 395.5, 400, 465; 379/201.09, 201.03; 709/217, 218, 219, 223, 225, 249, 311, 315

(56) References Cited

U.S. PATENT DOCUMENTS

| | | | | |
|---|---|---|---|---|
| 5,469,500 A | * | 11/1995 | Satter et al. ............ | 379/201.05 |
| 5,862,334 A | * | 1/1999 | Schwartz et al. ............ | 709/223 |
| 6,094,479 A | * | 7/2000 | Lindeberg et al. ..... | 379/220.01 |
| 6,282,281 B1 | * | 8/2001 | Low ............................ | 379/230 |
| 6,317,428 B1 | * | 11/2001 | Mercouroff et al. ........ | 370/360 |
| 6,341,162 B1 | * | 1/2002 | Kelly et al. ............ | 379/221.09 |
| 6,393,476 B1 | * | 5/2002 | Barnhouse et al. ......... | 709/223 |

FOREIGN PATENT DOCUMENTS

| | | |
|---|---|---|
| EP | 0 726 682 A2 | 8/1996 |
| EP | 0 873 024 A1 | 10/1998 |
| GB | 2 318 701 A | 4/1998 |
| WO | WO 97/40635 | 10/1997 |
| WO | WO 98/28885 | 7/1998 |

* cited by examiner

Primary Examiner—Ricky Ngo
Assistant Examiner—Christopher M Swickhamer
(74) Attorney, Agent, or Firm—Sughrue Mion, PLLC

(57) ABSTRACT

A gateway transmits messages between a first network and a second network to enable the first network to access services in application servers on the second network. It associates a representative element for a dialog with a node of the first network for a given service call. It associates the same representative element for a dialog with another node of the first network relating to the same service call.

9 Claims, 2 Drawing Sheets

GATEWAY BETWEEN A DATA NETWORK AND A SERVICE NETWORK

BACKGROUND OF THE INVENTION

1. Field of the Invention

The present invention concerns a gateway between two data networks enabling a first network to access services in application servers on a second network. One application of the invention concerns an intelligent network. An intelligent network comprises a service network and a voice or data transport network.

2. Description of the Prior Art

The service network can have an object-oriented distributed architecture. One such architecture well known to the skilled person is the Common Object Request Broker Architecture (CORBA) of the Object Management Group (OMG). It comprises application servers, also known as service control points in the specialist terminology of intelligent networks. Services are installed on various application servers at various geographical locations, each server comprising a computer or a set of computers generally connected to at least one database. The following description uses both the term application server and the acronym SCP (Switching Control Point). In a CORBA architecture, the SCP is itself distributed.

Nodes of the transport network dialog with the application servers of the service network via a signaling network. The nodes of the transport network are in practise various systems able to handle a call, for example service access switches and intelligent peripherals. Intelligent peripherals are generally voice interface systems which can be added to the switches. The remainder of the description uses the acronym SSP (Switching Service Point) to designate the switch and the acronym IP (Intelligent Peripheral).

It is currently proposed that the communication protocol of the network nodes (on the signaling network) should be different from the communication protocol of the service network and therefore of the SCP. For example, the protocol for messages used by the service network is a protocol based on object requests, for example the CORBA protocol, while the protocol used for messages by the nodes of the transport network is an Intelligent Network Application Protocol (INAP), for example, defined by the Q.12xx series recommendations of the International Telecommunication Union—Telecommunication standardization sector (ITU-T), and is not based on object requests at all.

A simple solution to this technical problem is to use a translation gateway to translate INAP messages from the nodes of the transport network and addressed to the application servers into messages understandable to the application servers, and vice versa.

A translation gateway of the above kind translates each message of the dialog between the various nodes of the transport network involved in a call of a given service (in other words, for a given service session) and an application server offering that service.

There are therefore as many messages at the gateway input as at the output.

An object of the invention is to reduce the number of messages exchanged with the service network to improve its performance by reducing congestion of the network, more particularly when the call to a service involves a plurality of nodes of the transport network, typically a service access switch (SSP) and an intelligent peripheral of that network.

In the current state of the art, a call on the intelligent network is received by an SSP of the transport network. If it is a call to a particular service, this is detected by the SSP switch which instigates a dialog with an application server SCP that offers that service (in other words, on which that service runs).

Some services, for example services involving authentication of the caller, require information that can only be obtained from an intelligent peripheral. The server SCP then requests the switch SSP to reroute the call to an intelligent peripheral and the latter instigates dialog with the SCP to obtain additional information. The intelligent peripheral can be a peripheral associated with the switch, i.e. directly accessible by the switch, or an intelligent peripheral associated with another switch of the transport network.

Thus the SCP has to manage two different dialogs for the same service call, a dialog with the SSP and a dialog with the intelligent peripheral.

The SCP can dialog directly with the intelligent peripheral if the communication protocol associated with the peripheral is the same as that of the SCP, i.e. the CORBA protocol, for example, or indirectly, via the gateway, if the protocol of the intelligent peripheral is different, and in particular follows the protocol of the SSP.

An object of the invention is to improve the performance of the service network in this intelligent architecture configuration in which a plurality of nodes of the transport network can be involved in the same service call.

The invention seeks to reduce the number of messages and to enable a better rate of re-use through improved modularity of the codes (programs).

The invention achieves this object in a gateway in which software processing usually executed on the data processing systems (application servers) on which the services are physically installed is distributed.

The gateway therefore comprises elements representing these services.

When it receives a call for a service transmitted by an SSP, the gateway associates an element representing the called service. This representative element provides software processing which includes monitoring the dialog with the SSP to collect all the information that the SSP can supply concerning the call.

In accordance with the invention, when the call is routed to an intelligent peripheral which sends a corresponding message to the gateway, the gateway associates that call from the peripheral with the representative element previously associated with the SSP.

In this way, a single representative element is used for the same service call involving a plurality of nodes of the transport network.

SUMMARY OF THE INVENTION

The invention therefore concerns a gateway between two data networks enabling a first network to access services in application servers of the second network, the first network comprising nodes susceptible of being involved in a call to a given service, the messages from at least one of the nodes of the first network conforming to a protocol different from the protocol of the messages from said application servers, which gateway:

comprises elements representative of services able to manage the various protocols, associates a representative element for a dialog with a node of the first network for the call to a given service, and associates the same representative element for a dialog with another node of the first network relating to the same service call.

According to the invention, the representative element controls the dialogs with the nodes of the first network for the service call to collect all the information it is necessary to transmit to an application server offering the service.

Control of the dialogs is effected autonomously by the representative element for at least a part of the dialog.

Also, the representative element composes messages by assembling information collected by means of the dialogs with the two nodes of the first network.

Finally, the representative element comprises a software process enabling a particular behavior to be adopted that corresponds to a request for specialization of the service or a sub-service which results from the information collected.

Other features and advantages of the invention are explained in the following description given by way of non-limiting example and with reference to the accompanying drawings.

DETAILED DESCRIPTION OF THE PREFERRED EMBODIMENT

Figure 1:
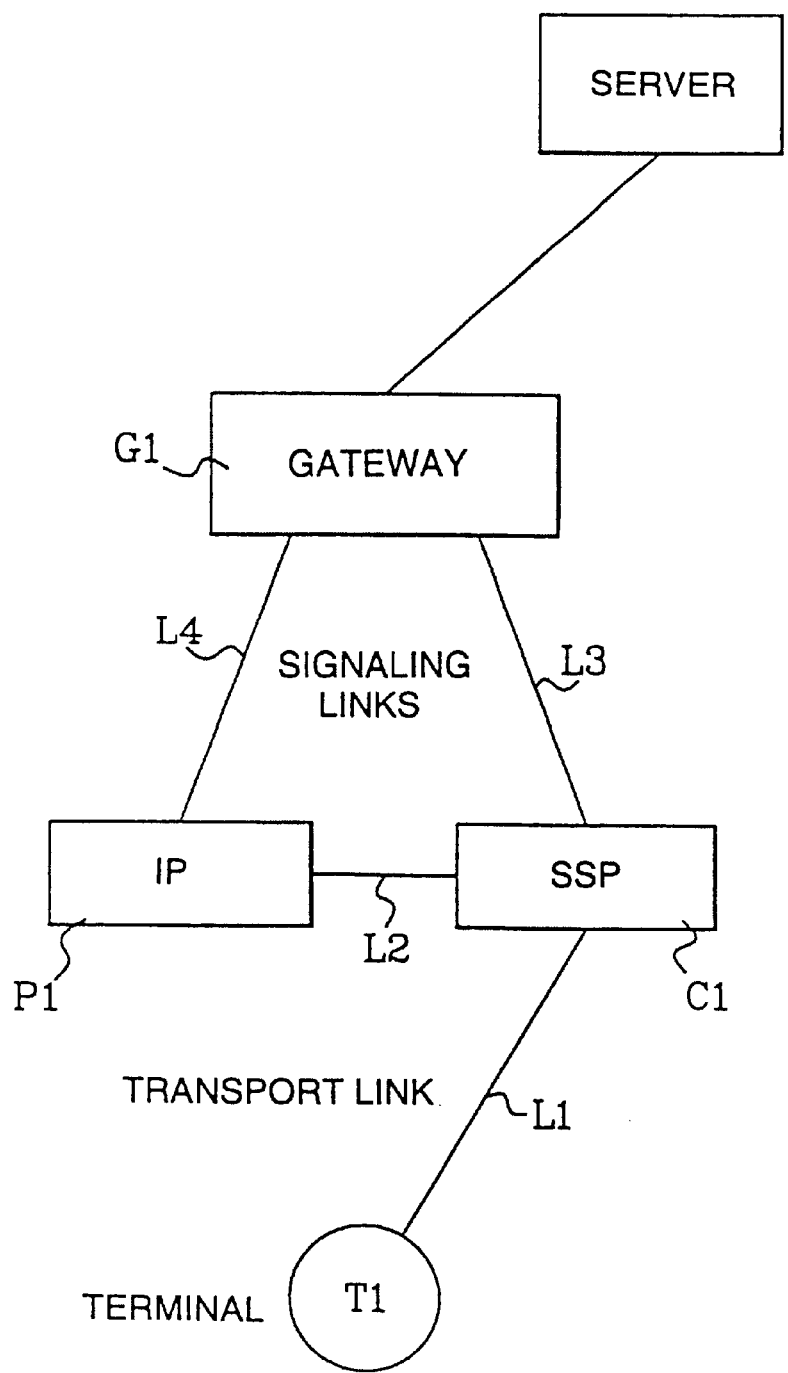
FIG. 1 is a block diagram of the connections between an application server and the nodes of a transport network for a call session in the context of an intelligent network architecture.

FIG. 1 shows the connections between the various elements involved in a service call session in one example of an intelligent network architecture.

A call terminal T1 is connected by a transport link L1 to a service access switch SSP denoted C1 in the figure.

In this example, the SSP C1 has an intelligent peripheral IP, denoted P1 in the figure, to which it can reroute a call directly via a transport link L2. The links L1 and L2 are part of the voice transport network. The SSP C1 and the peripheral P1 are connected to a gateway G1 by respective signaling links L3 and L4.

The above architecture is well known to the skilled person in the context of a gateway whose function is limited exclusively to translating messages between the SSP and the IP, on the one hand, and an application server SCP, on the other hand.

In accordance with the invention, the gateway is converted into an intelligent gateway which can manage dialog with the nodes of the transport network.

In a preferred embodiment of the invention, the gateway composes messages for an application server offering the called service by intelligently assembling information collected by means of such dialogs.

Figure 2:
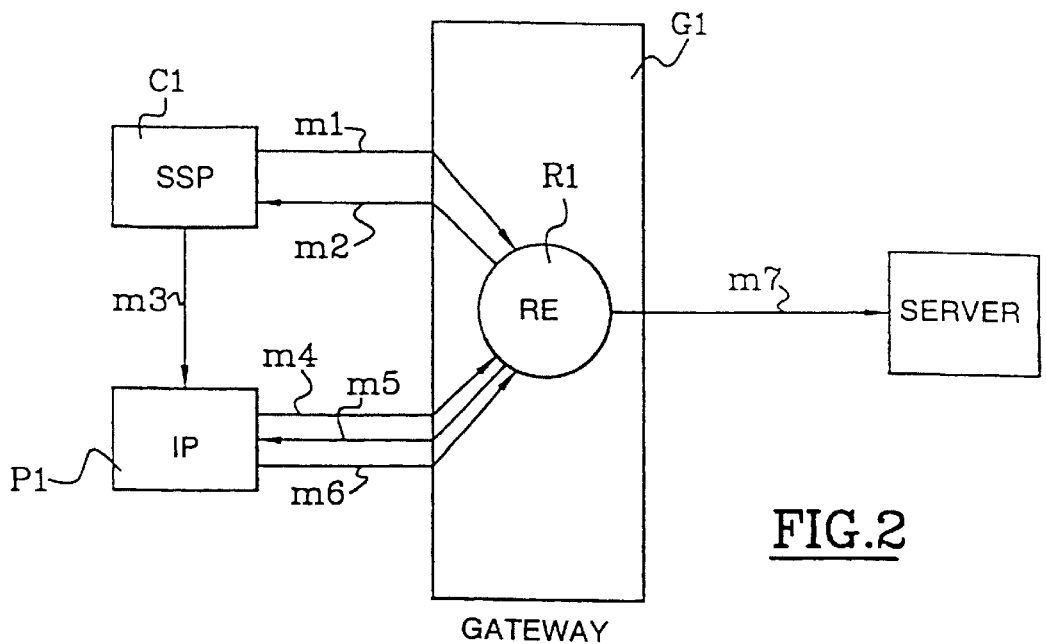
FIGS. 2 and 3 are block diagrams of messages exchanged with a gateway in accordance with the invention.
Figure 3:
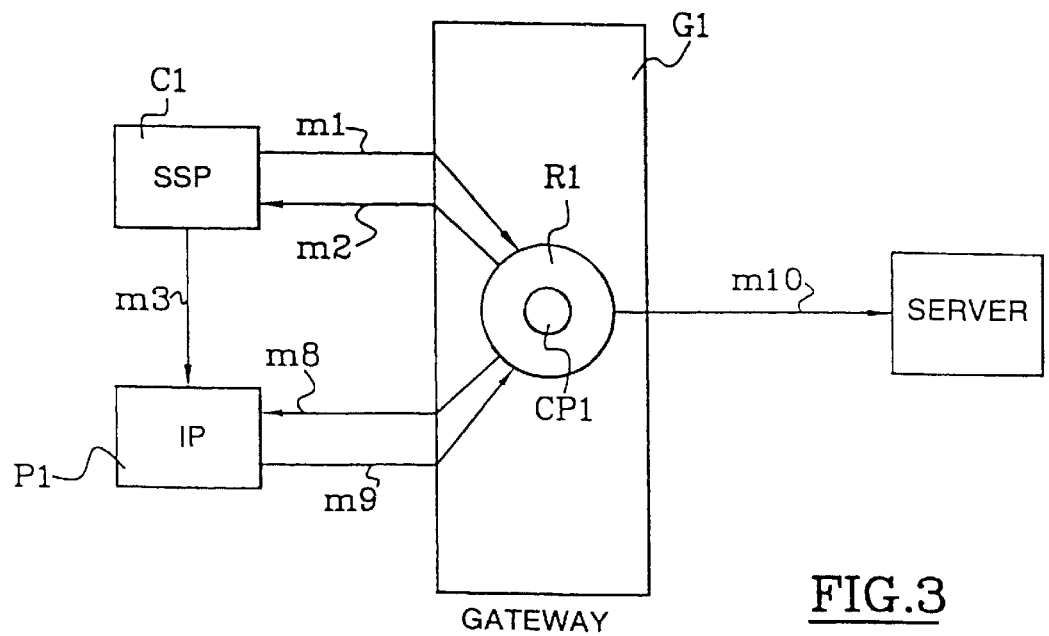

This is shown in FIGS. 2 and 3, in two service call examples for which the caller has to be authenticated. These are typical examples of applications for which the SSP must reroute the call to an intelligent peripheral IP of the transport network.

In accordance with the invention, the gateway G1 comprises elements representing services. Each representative element is an object or a group of objects (in the object-oriented sense) which is used to manage a typical dialog with nodes of the transport network for one or more services.

In the example shown in FIG. 2, the SSP C1 which has received from terminal T1 a call corresponding to a service sends a first message m1 to the gateway G1 including the call number. The gateway associates an element representative of the called service, denoted R1 in the figure. The representative element then sends back a message m2 indicating to the SSP that it must reroute the call to an intelligent peripheral IP to enable a dialog, generally a voice dialog, between the peripheral and the caller at the terminal T1, with the aim of obtaining additional information. The message m2 includes information identifying the call, to be sent to the IP, to enable the gateway to correlate the call from the SSP and the subsequent call from the IP.

Because in this example the SSP has an IP P1 available via a direct link, it can reroute the call to the IP P1 by sending it the corresponding message m3 including the identification information in particular.

The intelligent peripheral then sends the gateway G1 an assistance request message m4 with the call identification information. The gateway can therefore send the message to the representative element R1 already associated with the SSP. The representative element then indicates information to be collected in a message m5. In the case of access to a service necessitating authentication, it is the identification number. The intelligent peripheral obtains this information from the calling terminal T1 and then sends a message m6 to the gateway containing the collected information.

In this example, the representative element then has all the necessary information for accessing the called service.

In accordance with the invention, it composes a message m7 to an application server offering the service. The message m7 takes account of all the information collected by means of the two dialogs with the SSP and the IP.

In an improvement shown in FIG. 3, for one example of access to a service including a menu, on receiving the message m4 the representative element R1 sends a message m8 to the IP to tell it that it must request the caller to select a specialization of the service or of a sub-service thereof, chosen from a menu.

The IP sends it the information collected in a message m9. The representative element can then send a message m10 to an application server offering the called service.

In accordance with the invention, the representative element is also capable of adopting a particular behavior CP1, i.e. of executing a particular software process corresponding to dedication of the service accessed or a sub-service thereof. For example, if that specialization corresponds to a shared billing call, it can start particular software process corresponding to recording the start and end of the off-hook condition.

The gateway in accordance with the invention in practise has protocol stacks for receiving messages transmitted by nodes of the transport network and a representative element of the gateway.

For example, if the switches SSP use the INAP, the gateway includes an INAP stack.

This stack is used for intelligent peripherals using the same protocol stack.

A CORBA protocol stack is used for nodes of the network using another protocol, typically intelligent peripherals using the CORBA protocol.

Note that, in the examples of service calls using a gateway in accordance with the invention described here by way of explanation of the invention, the gateway controls dialog with the nodes of the network involved in a service call autonomously, at least in respect of the part described for collecting information needed before accessing the service proper on an application server. Then, in the phase of access to that service, the dialogs with the nodes of the network managed by the gateway can be remote controlled by the application server concerned.

The invention just described is particularly beneficial in the context of intelligent networks. It applies in particular, but not exclusively, to intelligent networks in which the application servers use a protocol based on object requests, such as the CORBA protocol.

The present invention considerably improves the modularity of the network and enhances its performance. The capacity for dialog with an intelligent peripheral constitutes one limitation. The dialogs that the gateway can manage are fixed and a new service must be able to adapt to them. To this end, the possibility of direct dialog between the IP and the SCP can be provided.

What is claimed is:

1. A gateway, between first and second data networks, for enabling the first network to access services in application servers of the second network, the first network comprising nodes susceptible of being involved in a call to a given service, the messages from at least one of the nodes of the first network conforming to a protocol different from the protocol of the messages from said application servers, the gateway comprising:

software elements representing the services of the second network;

the software elements being adapted to manage the protocols of the first and second networks;

the gateway performing operations comprising:

identifying the opening of a first dialog, by one of the nodes of the first network, for an access to a given one of the services in the second network;

in response to the opening of the first dialog, associating a representative one of the software elements with the first dialog;

identifying the opening of a second dialog, by another one of the nodes of the first network, for the access to the given service;

making a determination as to whether the first dialog and the second dialog are related to the same access of the given service; and when the determination is affirmative, associating the same representative element for the first dialog with the second dialog and then communicating with one of the application servers, for the given service, using the representative element.

2. The gateway claimed in claim 1, wherein said representative element controls the dialogs with said nodes of said first network for said service call to collect all the information it is necessary to transmit to an application server offering said service.

3. The gateway claimed in claim 2, wherein control is effected autonomously by said representative element for at least a part of said dialogs.

4. The gateway claimed in claim 1, wherein said representative element composes messages by assembling information collected by means of said dialogs with said two nodes of said first network, which messages are transmitted to an application server offering said service.

5. The gateway claimed in claim 2, wherein said representative element adopts a particular behavior corresponding to a request for specialization of the accessed service or a sub-service which results from said dialogs between said representative element and said nodes of said first network.

6. The gateway claimed in claim 1, wherein each representative element comprises one or more objects.

7. An intelligent network including a gateway as claimed in claim 1.

8. The intelligent network claimed in claim 7, wherein the protocol for messages from said application servers is a protocol based on object requests.

9. The intelligent network claimed in claim 8, wherein said protocol conforms to the CORBA specifications.

* * * * *